(12) United States Patent
Ponikiewski et al.

(10) Patent No.: US 11,433,939 B2
(45) Date of Patent: Sep. 6, 2022

(54) CLAMP MECHANISM FOR A RAKE ADJUSTABLE STEERING COLUMN ASSEMBLY

(71) Applicant: TRW Steering Systems Poland SP. Z.O.O., Czechowice-Dziedzice (PL)

(72) Inventors: Pawel Ponikiewski, Pewel Mala (PL); Artur Wojtalik, Katowice (PL); Slawomir Kwasny, Czechowice-Dziedzice (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 364 days.

(21) Appl. No.: 15/780,764

(22) PCT Filed: Dec. 2, 2016

(86) PCT No.: PCT/EP2016/079596
§ 371 (c)(1),
(2) Date: Jun. 1, 2018

(87) PCT Pub. No.: WO2017/093489
PCT Pub. Date: Jun. 8, 2017

(65) Prior Publication Data
US 2020/0247457 A1  Aug. 6, 2020

(30) Foreign Application Priority Data

Dec. 2, 2015 (EP) .................................... 15461579
Dec. 14, 2015 (GB) .................................... 1522012

(51) Int. Cl.
*B62D 1/184* (2006.01)
*B62D 1/187* (2006.01)

(52) U.S. Cl.
CPC .............. *B62D 1/184* (2013.01); *B62D 1/187* (2013.01)

(58) Field of Classification Search
CPC ................................ B62D 1/184; B62D 1/187
See application file for complete search history.

(56) References Cited

U.S. PATENT DOCUMENTS 5,722,299 A * 3/1998 Yamamoto ............. B62D 1/184
280/775
5,743,151 A * 4/1998 Khalifa .................. B62D 1/184
280/775

(Continued)

FOREIGN PATENT DOCUMENTS

CN       103370255 A     10/2013
CN       103889820 A      6/2014

(Continued)

OTHER PUBLICATIONS

Patent Act 1977: Search Report under Section 17(5). Application No. GB1522012.2, dated May 27, 2016.

(Continued)

*Primary Examiner* — Laura Freedman
(74) *Attorney, Agent, or Firm* — Robert James Harwood (57) ABSTRACT

A clamp mechanism for a steering column assembly includes a support bracket; a clamp pin; a fixing member; and a toothed rack. The toothed rack includes a plurality of recesses each spaced from an adjacent recess by a land and extends alongside the elongate slot. A locking pin is located in a bore in the fixing member that is biased in a direction towards the toothed rack by a spring and a clamp means which may cause the fixing member to move between a clamped condition and unclamped condition.

6 Claims, 6 Drawing Sheets

(56) References Cited

U.S. PATENT DOCUMENTS

| | | | | |
|---|---|---|---|---|
| 6,092,957 | A * | 7/2000 | Fevre | B62D 1/184 |
| | | | | 280/775 |
| 7,325,467 | B2 * | 2/2008 | Breuss | B62D 1/184 |
| | | | | 280/775 |
| 7,963,561 | B2 * | 6/2011 | Waibel | B62D 1/184 |
| | | | | 280/777 |
| 9,168,945 | B2 * | 10/2015 | Hiesse | B62D 1/184 |
| 9,744,982 | B2 * | 8/2017 | Marx | B62D 1/184 |
| 9,862,404 | B2 * | 1/2018 | Russell | B62D 1/184 |
| 2004/0012185 | A1 | 1/2004 | Lutz | |
| 2008/0231030 | A1 | 9/2008 | Menjak et al. | |

FOREIGN PATENT DOCUMENTS

| | | | |
|---|---|---|---|
| CN | 103963823 | A | 8/2014 |
| CN | 104029714 | A | 9/2014 |
| CN | 105026223 | A | 11/2015 |
| JP | 2004034945 | A | 2/2004 |
| JP | 2015214205 | A | 12/2015 |

OTHER PUBLICATIONS

PCT International Search Report and the Written Opinion, Application No. PCT/EP2016/079596 filed Dec. 2, 2016, dated Jan. 31, 2017.

\* cited by examiner

CLAMP MECHANISM FOR A RAKE ADJUSTABLE STEERING COLUMN ASSEMBLY

CROSS-REFERENCE TO RELATED APPLICATIONS

This application is a national stage of International Application No. PCT/EP2016/079596, filed 2 Dec. 2016, the disclosures of which are incorporated herein by reference in entirety, and which claimed priority to Great Britain Patent Application No. 1522012.2, filed 14 Dec. 2015, the disclosures of which are incorporated herein by reference in entirety, and European Patent Application No. 15461579.3, filed 2 Dec. 2015, the disclosures of which are incorporated herein by reference in entirety.

BACKGROUND OF THE INVENTION

This invention relates to improvements in clamp mechanisms for a steering column assembly, in particular rake adjustable steering column assemblies.

It is known to provide a steering column assembly that can be adjusted for at least one of reach and rake. The steering column assembly typically comprises a shroud that supports a steering shaft. Where the assembly is adjustable for reach the shroud may comprise an upper part and a lower part, with the two being telescopically adjustable to allow the length of the shroud to be altered. The upper part is located closer to the steering wheel than the lower part. The steering shaft, which may also be telescopically, extends along the shroud and is supported by one or more bearing assemblies. One end of the steering shaft connects to a steering wheel of the vehicle and the other to a steering rack or gearbox. The shroud is held in position by a clamp mechanism that secures the shroud to a support bracket which is in turn secured to a fixed part of the vehicle such as a cross-member located behind the dashboard.

The steering column assembly may be manually adjustable by including an operating lever that can be operated by a user to move the clamp mechanism between an unclamped condition in which at least a part of the shroud can be moved relative support bracket and a clamped condition in which the part of the shroud is fixed relative to the support bracket. The clamp mechanism typically includes a clamp pin or bolt that rotates around its axis during clamping and unclamping and the lever allows the driver to apply a sufficient turning moment the clamp pin or bolt.

BRIEF SUMMARY OF THE INVENTION

According to a first aspect of the invention there is provided a clamp mechanism for a steering column assembly comprising: a support bracket; a clamp pin that passes through an elongate slot in the support bracket and an opening in a shroud of the steering column; a fixing member; a toothed rack carried by the support bracket in a position facing the fixing member, the toothed rack comprising a plurality of recesses each spaced from an adjacent recess by a land, the toothed rack extending alongside the elongate slot; a locking pin located in a bore in the fixing member that is biased in a direction towards the toothed rack by a spring; and clamp means that in use causes the fixing member to move between a clamped condition and unclamped condition; in which in the clamped condition the locking pin engages with the toothed rack such that the pin is either located in one of the recesses and thereby prevents movement of the clamp pin along the elongate slot in at least one direction or engages a land under sufficient force from the spring that any subsequent movement of the clamp pin along the slot whilst in the clamped condition will cause the pin to move into a recess, and in which in the unclamped position of the fixing member the locking pin is either held clear of the fixed rack or contacts the fixed rack with insufficient force from the spring to retain the lock pin within a recess of the fixed rack, thereby permitting free movement of the clamp pin along the slot.

The clamp mechanism therefore provides for an unclamped condition in which the steering can be adjusted for rake and a clamped condition in which it cannot and in which it is positively prevented from moving. Notably a small amount of movement is possible if excessive force is applied but only when the pin is in contact with a land and this movement stops as soon as the pin is aligned with, and then enters, a recess in the support bracket.

The clamp means may include a cam mechanism having a fixed cam member and a moving cam member, and the fixing member may comprise one of the fixed cam member and moving can member. It may otherwise be a separate component located between the cam mechanism and the support bracket.

The assembly may further comprise a return spring that acts upon the fixing member to bias it away from the support bracket, the return spring being overcome by the clamp means when in the clamped condition.

The return spring may be threaded onto the clamp pin. It may act between the clamp pin and the fixing member, or between the support bracket and fixing member or between the shroud and fixing member.

The support bracket may comprise a base portion that in use is secured to a fixed part of the vehicle body, such as a structural beam behind the dashboard or to the vehicle bulkhead. It may include a pair of arms that depend from the base portion on opposing sides of the shroud.

Where there are two arms, both may include elongate slots through which the clamp pin passes. The clamp pin may be provided with a head on each end with the clamp means, arms and shroud threaded onto the clamp pin between the heads.

The locking pin may be located in a bore which has an axis parallel to the axis of the clamp pin but offset from that axis so it is aligned with the fixed rack. The bore may provide a guide for the locking pin, which may slide axially within the bore. The locking pin may be a snug fit within the bore.

The clamp mechanism may additionally comprise movement limiting means for preventing excess movement of the locking pin within the bore. The movement limiting means may physically prevent movement of the locking pin past a predetermined position.

The locking pin may include first and second ends, the first end being receivable within the toothed rack and the second end opposing said first end. The second end may protrude from the bore.

The movement limiting means may include a circlip attachable at or adjacent to the second end of the locking pin and may abut the fixing member when the locking pin is in a fully extended condition.

The bore may include a spring seat, preferably formed by a radially inward protrusion. The radially inward protrusion may comprise a lip.

The locking pin may include a radially extending member. The radially extending member may include a locking pin portion having a greater diameter than a main body of the locking pin. The radially extending member may be located towards the first end of the locking pin.

The spring may be seeable between the spring seat of the bore and the radially extending member of the locking pin. The spring may also be wound round the main body of the locking pin.

The recesses of the toothed rack may preferably comprise grooves that extend orthogonal to the axis of the clamp pin and to the long axis of the slot in the bracket. The slot may be substantially vertical, permitting adjustment of the clamping mechanism for rake as the clamp pin is moved up and down the slot.

The recesses of the toothed rack are recessed relative to the level of the lands between the recesses. As such, the toothed rack may instead be formed such that the recesses are on the same level as the surrounding features and the lands are raised in relation to them.

The slot may be substantially vertical permitting adjustment of the clamp for rake as the clamp pin is moved up and down the slot.

The clamp mechanism may include a locking lever that in use allows a user to move the clamp mechanism between the clamped and unclamped positions.

When the pin is engaged with the teeth of the rack, the clamp mechanism being in the clamped position, the clamp pin may be prevented from moving in either direction along slot.

In one arrangement, the teeth of the toothed rack may comprise saw teeth arranged to cooperate with the locking pin to prevent the clamp pin moving along the slot in either direction during normal use, but to allow the clamp pin to move along the slot in the direction corresponding to the steering wheel being moved down when excessive force is applied to the steering column assembly in that direction. This will ensure the locking pin is not damaged if a driver pulls down on the steering wheel with great force whilst ensuing no accidental upward movement of the wheel is possible.

According to a second aspect of the invention there is provided a steering column assembly comprising a clamp mechanism in accordance with the first aspect of the invention.

Other advantages of this invention will become apparent to those skilled in the art from the following detailed description of the preferred embodiments, when read in light of the accompanying drawings.

DETAILED DESCRIPTION OF THE INVENTION

Figure 1:
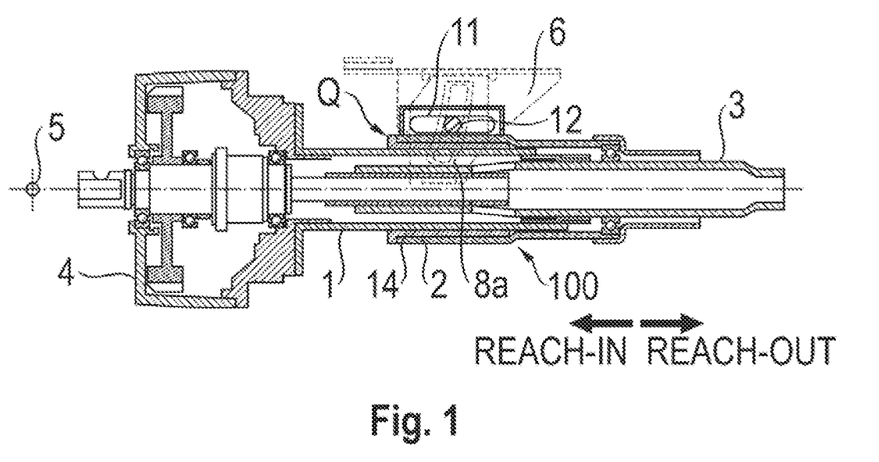
FIG. 1 is a cross sectional view of a steering column assembly in accordance with the present invention.
Figure 2:
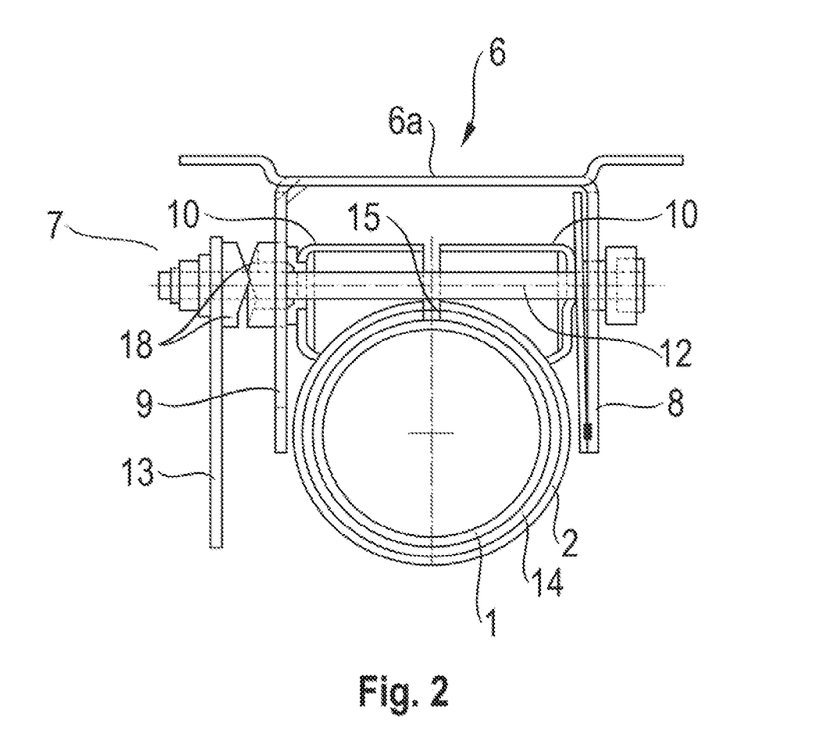
FIG. 2 is a view of the steering assembly showing a clamp mechanism which fixes the shroud of the assembly relative to the vehicle.

A steering column assembly 100 is shown in FIGS. 1 and 2 of the accompanying drawings. The assembly comprises a shroud 1,2 which is fixed to the vehicle (not shown), a steering shaft 3 supported in bearings journaled to the shroud, a steering wheel (not shown) connected to one end of the shaft 3, and an electric power assisted steering gearbox 4 connected to the end of the steering shaft 3 furthest from the steering wheel. The gearbox 4 connects the shaft 3 to a motor which provides assistance when the driver tries to turn the wheel by applying a torque of the same sense as that applied by the driver. The gearbox also connects the shaft through further mechanical links such as a steering rack to the road wheels.

The shroud 1, 2 is fixed to the vehicle at one point by a pivot in the region of 5 close to the gearbox and at another point closer to the steering wheel in the region of 6 through an adjustable clamp mechanism 7 seen in FIG. 2. When released the clamp mechanism 7 enables the shroud 2 to tilt up and down about the pivot to provide rake adjustment of the steering wheel.

As can also be seen in FIG. 1 the shroud comprises a first (inner) member 1 and a second (outer) member 2, and end of the first member 1 being received partially within an end of the second member 2 and free to telescope relative to the second member 2 when the clamp mechanism 7 is released. Both members 1, 2 are generally cylindrical metal tubes. As can be seen in FIG. 1 the inner diameter of the second member 2 is greater than the outer diameter of the first member 1 and a guide bush 14 comprising a cylindrical sleeve of low friction material (e.g. plastic) is located between them to fill the gap. The guide hush is fixed to the inner wall of the second member and is free to slide over the outer wall of the first member. The guide bush 14 has an axial slit 15 through its wall. The second member 2 can slide over the end of the first member 1 guided by the low friction guide bush. The steering shaft 3 is also provided in two parts which can telescope to follow changes in length of the shroud. This movement provides reach adjustment of the steering wheel.

The clamp mechanism 7 comprises a support bracket 6 which has an inverted U-shape in cross section (when viewed along the length of the shroud). The base 6a of the U-shaped bracket 6 is rigidly fixed to the vehicle body above the shroud 1, 2 and has two arms 8, 9 that depend down either side of the shroud. Clamp rails 10, visible in FIGS. 1 and 2, are welded to the top of the shroud along a length of the shroud which is surrounded by the arms of the support bracket 6. The clamp rails 10 are a snug fit within the arms of the bracket 6 so that the side walls of the clamp rail touch the inside of the arms of the bracket 6 and prevent excessive side to side movement of the shroud relative to the bracket 6. As shown the rails 10 are fixed to the top of the second member 2 of the shroud which has the larger diameter.

Each arm 8, 9 of the bracket 6 is provided with a vertically extending elongate slot. One slot 8a in arm 8 can be seen in FIG. 1. Each side wall of the clamp rail 10 is provided with a substantially horizontal slot 11 as shown in FIG. 1. A clamp pin 12 passes through the slots in the arms 8,9 and clamp rails 10 and is provided with a fixed nut on one end and clamp means, for adjusting the clamp mechanism between a clamped condition and an unclamped condition, on the other operated by a hand lever 13.

The clamp means of the depicted embodiment comprises a cam mechanism having a fixed cam member 16 and a moving cam member 17. The fixed cam member 16 is rotationally fixed in relation to the support bracket 6, whilst the moving cam member 17 is rotationally adjusted by movement of the hand lever 13. Due to the cam surfaces 18 of the fixed cam member 16 and the moving cam member 17 contacting at different points, the movement of the hand lever 13 by the driver forces the fixed cam member 16 towards the fixed head at the other end of the clamp pin 12. This clamps the arms 8, 9 of the bracket 6 to the side walls of the clamp rail 10 and locks the shroud in place. At the same time this action closes an axial slit 15 in the top of the second member 2 within the clamp rail 10 causing its inner diameter to reduce. This compresses the second member 2 onto the guide bush 14 and squeezes the guide bush 14 onto the inner member, locking the second member 2 and first member 1 together.

The driver can also move the lever 13 to expand the distance between the fixed head and fixed cam member 16 which unclamps the bracket arms 8, 9 and clamp rail 10. In this condition the clamp pin 12 can slide up and down the vertical rails to give rake adjustment. The second member 2 and the guide bush 14 will no longer be crushed onto the first member 1 and so they are free to move relative to the first member 1 as the horizontal slots 11 move relative to clamp pin to give reach adjustment.

Figure 3:
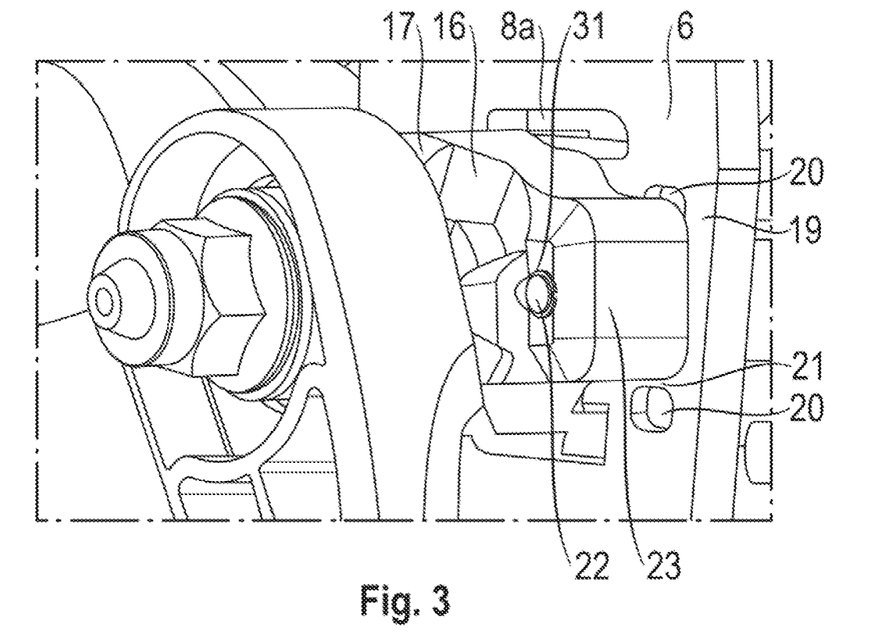
FIG. 3 is an enlarged view of a portion of the clamping mechanism, including the fixing member and toothed rack.

When adjusting the steering column assembly 100 for rake, it is desirable to provide positive location of the clamp pin 12 relative to the support bracket 6. An enlarged view of these components is shown in FIG. 3. The moving can member 17 may move relative to the fixed cam member 16. The support bracket 6 has a toothed rack 19 running in a substantially parallel direction to the vertical slot 8a in the support bracket 6, which is shown separately in FIG. 4.

Figure 4:
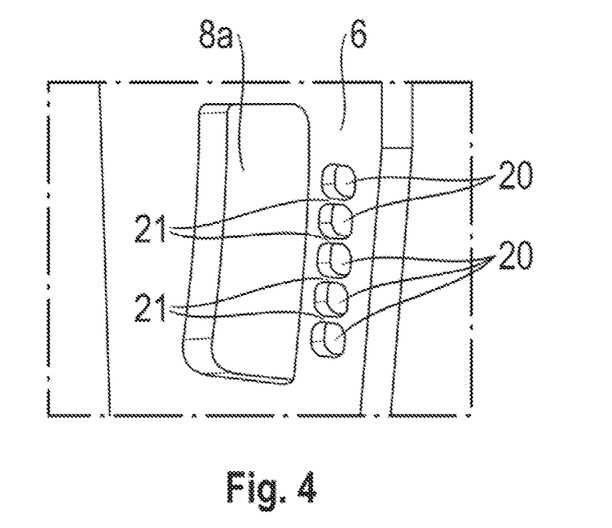
FIG. 4 is an enlarged view of the support bracket including the toothed rack.

The toothed rack 19 comprises a number of recesses 20 or depressions, each spaced apart from adjacent recesses by lands 21, along a longitudinal direction of the rack 19. In the present embodiment, the toothed rack 19 includes five recesses 20 and four lands 21, which provide five positions in which the clamping mechanism 7 may be positively locked. However, a greater or lesser number of recesses 20 may be provided, in order to provide a greater level of positively-secured adjustability. Similarly, the recesses 20 may be larger or smaller to increase or decrease the resolution of the adjustments. As shown, the recesses 20 of the present embodiment are slots, such that variations in alignment in a substantially horizontal direction may be allowed by the recesses 20, whilst still maintaining a secure lock in a substantially vertical direction.

Although depicted as part of the support bracket, the toothed rack may be formed as a separate component. It may be held within or adjacent to the support bracket, for instance.

Figure 5:
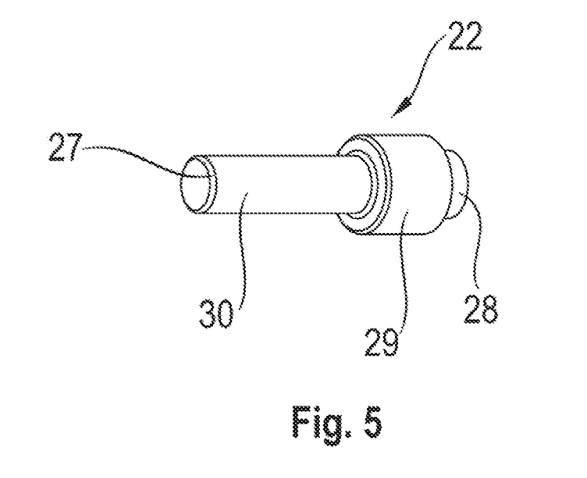
FIG. 5 is an enlarged view of the locking pin.

Receivable within each recess 20, when the clamping mechanism 7 is in a clamped condition, is a locking pin 22, as shown in FIG. 5. The locking pin 22 is, in this embodiment, housed within a fixing member 23, which is presently formed integrally with the fixed cam member 16. The inter-location of the locking pin 22, fixing member 23 and toothed rack 19 is shown in detail in FIGS. 6 and 7.

Although formed as a part of the fixed cam member 16, the fixing member may instead be a separate component, for example being held between the fixed can member 16 and the support bracket 6. Other arrangements will also be possible, without departing from the scope of the invention.

Figure 6:
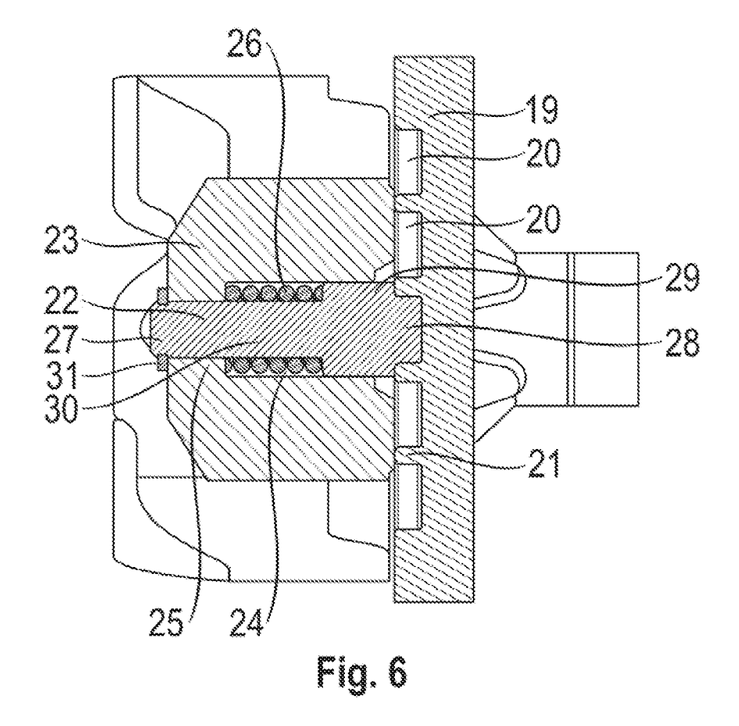
FIGS. 6 and 7 are cross-sectional views of the arrangement of the fixing member, locking pin, support bracket, and associated features, in a clamped and unclamped condition, respectively.
Figure 7:
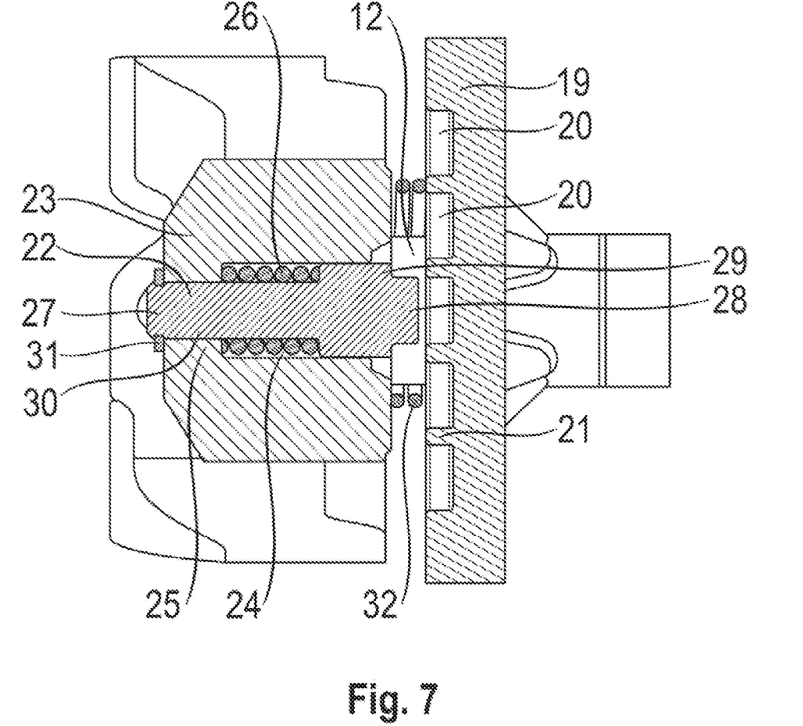

The toothed rack 19 faces the fixing member 23, such that the locking pin 22, which is housed within a bore 24 of the fixing member 23, may engage with the toothed rack 19 when the clamping mechanism 7 is in the clamped condition. The bore 24 is aligned parallel to the axis of the clamp pin 12, but is offset from this axis. The bore 24 passes through the fixing member 23 and includes a radially inward protrusion 25, forming a spring seat within the bore 24. This provides a seat on which spring 26 may be mounted. The bore 24 allows sliding of the locking pin 22 axially within the bore 24 and in the present embodiment is a snug fit around the locking pin 22 such that excessive radial movement is prevented.

The locking pin 22 includes first and second ends 27, 28, the second end 28 being receivable within the toothed rack 19 and the second end 28 opposing the first end 27. The locking pin 22 further comprises a radially extending member 29, which in this case is a locking pin portion which has a greater diameter than a main body 30 of the locking pin 22. In alternative embodiments, the radially extending member may be separately formed from the locking pin, for instance as a radial pin or clip.

Thus, the spring 26 may be mounted between the radially extending member 29 and the radially inward protrusion 25 of the bore 24, providing a spring force which encourages the locking pin 22 towards the toothed rack 19, in use. Presently, the spring 26 is wound around the main body of the locking pin.

A movement limiting means is provided for preventing excess movement of the locking pin 22, for instance, movement past a predetermined position which may result in dislocation of the locking pin 22 from the bore 24. In the present embodiment, the movement limiting means is a circlip 31 attachable at or adjacent to the first end 27 of the locking pin 22, the second end 28 protruding from the bore 21. Thus, the circlip may abut the fixing member 23 when the locking pin is in a fully extended condition. Such a scenario is shown in FIG. 6.

In FIG. 7 shows the clamping mechanism 7 in the unclamped condition. Thus it is shown that the movement limiting means ensures that the fully extended condition of the locking pin 22 does not allow the locking pin 22 to engage with the toothed rack 19, allowing free rake adjustment of the steering column assembly 100. Additionally, a return spring 32, which biases the fixing member 23 away from the support bracket 6 when the clamping mechanism 7 is in an unclamped condition, is also visible. The return spring 32 is, in this embodiment, threaded on to the clamp pin 12, but may be in any other viable position, such as adjacent to the bore 24 of the fixing member 23, for instance. When in the clamped condition, the return spring 32 is overcome or overpowered by the clamp means.

In use, the fixing member 23 may be engaged into the clamped condition at any position along the length of the slot 8a. When clamped, if the position of the locking pin 22 is coincident with a recess 20, the locking pin 22 will be engaged, providing the positive lock. If the position of the locking pin 22 is not coincident with a recess 20, the locking pin 22 will however, still be biased towards the support bracket 6 by the spring 26. As such, if the clamping mechanism 7 is forcibly moved when in the clamped condition, for instance in the event of a crash, the locking pin 22 will automatically engage with a recess 20 when it becomes coincident.

Advantageously, this automatic engagement prevents uncontrolled movement of the clamping mechanism 7. For example, where the clamping mechanism 7 of the present invention is not present, if the driver impacts the steering wheel, the clamp mechanism may be moved by a force of approximately 700 kN, which is enough to overcome the clamping friction, inducing a change in rake. In comparison, when the positive engagement of the present invention is utilised, the force to induce a change in rake may be increased to around 2.5 kN. Thus, uncontrolled movement of the rake can be minimized. Additionally, alternative mechanisms may be introduced to provide controlled collapse of the steering column prior to any change in rake.

Figure 8:
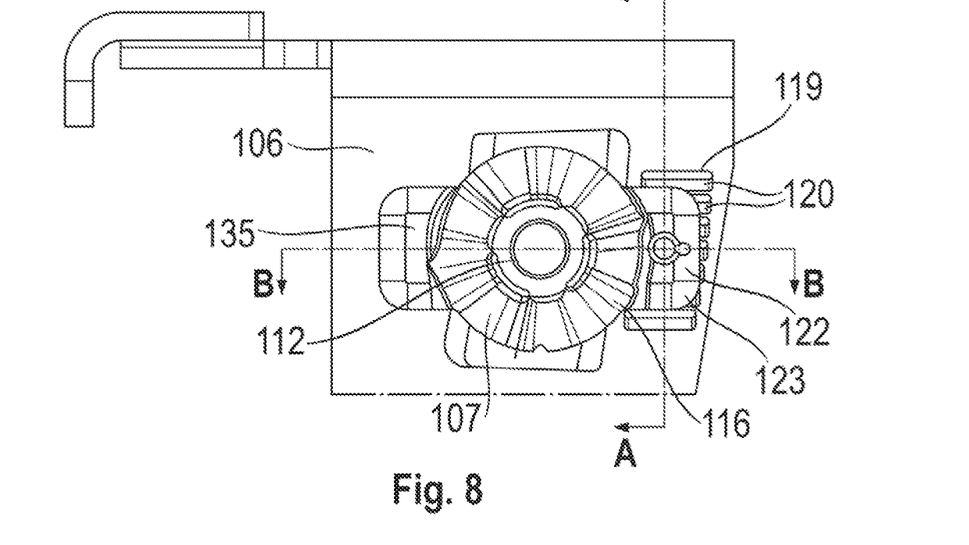
FIG. 8 is an enlarged view of a second embodiment of a clamping mechanism.
Figure 9:
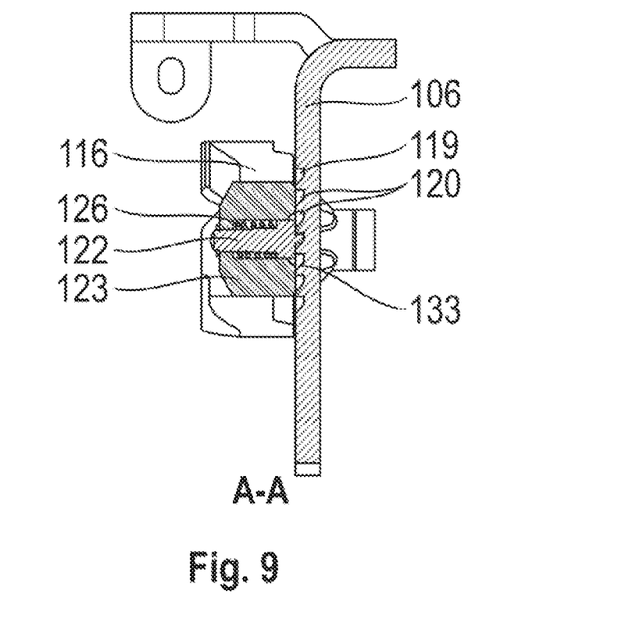
FIG. 9 is a cross-sectional view along line A-A of FIG. 8.
Figure 10:
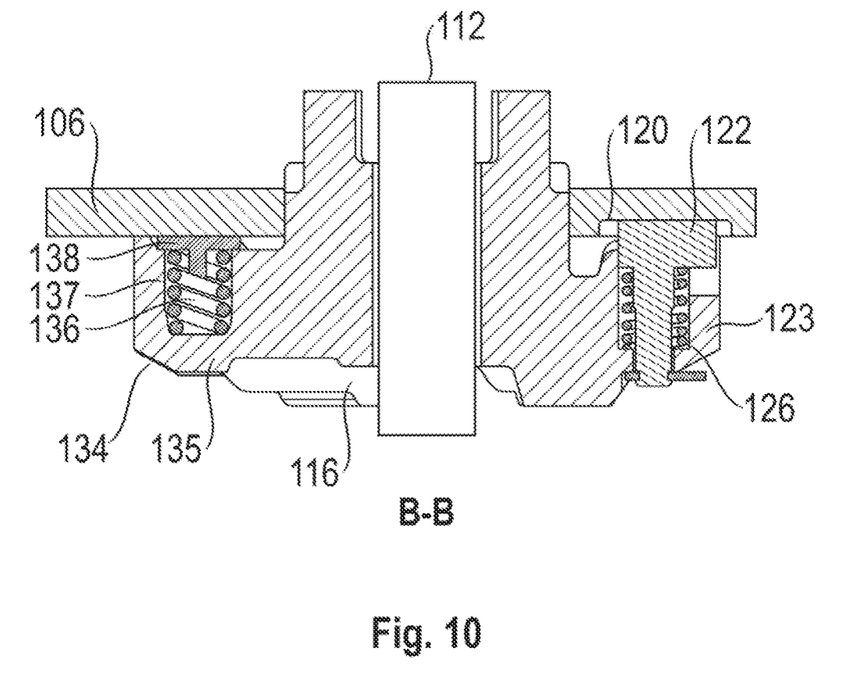
FIG. 10 is a cross-sectional view along line B-B of FIG. 8.

A second embodiment of a steering column assembly is shown in FIGS. 8, 9, and 10, showing parts of a clamp mechanism 107 and cam mechanism. The clamp mechanism 107 includes a support bracket 106 and slot 108a, through which a clamp pin 112 extends. Mounted on the clamp pin 112 is a fixed cam member 116, and a moving cam member (not shown). The general operation of the clamp mechanism 107 is the same as previously described and therefore no additional description is included, for brevity.

The support bracket 106 includes a toothed rack 119 which again runs substantially parallel to the vertical slot 108a. A number of recesses 120 are included in the toothed rack 119, each of which has a sawtooth profile 133. A locking pin 122 is housed within a fixing member 123 of the fixed cam member 116. Although similar in most regards to the locking pin 122 of the first embodiment, the locking pin 122 of the second embodiment is complimentarily or substantially complementarily shaped to be received within the saw-tooth profile 133 of the recesses 120. A spring 126 encourages this engagement, in use.

The saw-tooth profile 133 of each recess 120 is aligned such that the horizontal faces are towards the top of each recess 120 such that movement of the clamp pin 112 upwards is resisted strongly whilst movement in the opposite direction is less strongly resisted. As such, if a large downward force is exerted on the steering wheel, which is transmitted to the steering column assembly, for instance when entering or exiting a vehicle, the locking pin 122 will be encouraged to disengage with the recess 120 with which it is engaged, adjusting the rake of the steering column and thus preventing damage to the cam mechanism. Conversely, during a vehicular impact, the driver striking the steering column will tend to produce a force in an upward direction, which will be resisted by the locking pin 122 and thus the force will cause collapse of the steering column rather than forced adjustment of the rake.

The second embodiment also includes a balancing means 134 which opposes the bending moment on the clamp pin 112 created by the force exerted by the spring 126 on the locking pin 122 and fixing member 123. The balancing means 134 of the second embodiment includes a balancing member 135 which extends from the fixed cam member 116 in an opposite direction to the fixing member 123. A balancing spring 136 is housed within a bore 137 in the balancing member 135 which exerts a force between the balancing member 135 and the support bracket 106, and thus a bending moment on the clamp pin 112. Preferably, this bending moment will be substantially equal and opposite to the bending moment formed by the action of the spring 126 on the fixing member 123.

The balancing means 134 includes a pad 138 which is interposed between the balancing spring 136 and the support bracket 106 such that the force is spread over a greater area. The pad 138 may be formed of a low-friction material or include a low friction coating such that it does not cause substantial damage to the support bracket 106 during adjustment of the steering column assembly.

The first and second embodiments of the invention include different features. However, it is considered that each individual feature may be used in combination with other features of either embodiment. For example, balancing means may be applied to the first embodiment and the second embodiment may include a non-saw-tooth profile on the recesses. The embodiments are not intended to be limiting to the possible combinations of features.

It is foreseeable, for example, that the locking pin need not have a saw-tooth profile in order to engage with the saw-tooth profile of the toothed rack, as long as it is dimensionally capable of engaging sufficiently to create the positive lock required. Alternatively, the locking pin could have a saw-tooth profile whilst the recesses do not, whilst still having the ability to disengage when a force is exerted in one direction but not the other. Other possible combinations will be discernable by one skilled in the art.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A clamp mechanism for a steering column assembly comprising:
   a support bracket;
   a clamp pin that passes through an elongate slot in the support bracket and an opening in a shroud of a steering column;
   a fixing member being one of a fixed cam member or a moving cam member configured to change between a clamped condition and an unclamped condition;
   a toothed rack carried by the support bracket in a position facing the fixing member, the toothed rack comprising a plurality of recesses each spaced from an adjacent recess by a land, the toothed rack extending alongside the elongate slot;
   a locking pin and a spring located in a bore in the fixing member whereby the spring urges the locking pin towards the toothed rack; and
   a movement limiting means for preventing excess movement of the locking pin within the bore;
   wherein the locking pin engages with the toothed rack when the fixing member is in the clamped condition such that the locking pin is either engaged within one of the recesses or engaged with the land under sufficient force from the spring that any subsequent movement of the clamp pin along the slot whilst in the clamped condition will cause the locking pin to move into one of the recesses of the toothed rack;
   wherein the locking pin is located in the bore which has an axis parallel to an axis of the clamp pin but is offset from the axis of the clamp pin so the locking pin is aligned with the toothed rack;
   wherein the locking pin includes first and second ends, the first end being receivable within the toothed rack and the second end opposing the first end; and
   wherein the second end of the locking pin protrudes from the bore and the movement limiting means includes a circlip attachable at or adjacent to the second end.

2. The clamp mechanism as claimed in claim 1, wherein the movement limiting means abuts the fixing member when the locking pin is in a fully extended condition.

3. The clamp mechanism as claimed in claim 1, the spring being seatable between a radially inward protrusion of the bore and a radially extending member of the locking pin.

4. The clamp mechanism as claimed in claim 1, wherein the recesses comprise grooves that extend orthogonal to an axis of the clamp pin and to a long axis of the elongate slot in the support bracket.

5. The clamp mechanism as claimed claim 1 wherein the slot is substantially vertical, permitting adjustment of the clamp mechanism for rake as the clamp pin is moved up and down the slot.

6. The clamp mechanism as claimed in claim 1, further comprising a locking lever that in use allows a user to move the clamp mechanism between the clamped and unclamped conditions.

* * * * *